United States Patent [19]

Spengler

[11] Patent Number: 4,528,941
[45] Date of Patent: Jul. 16, 1985

[54] FREE-STANDING ENVIRONMENTAL CHAMBERS SUPPORTED BY PLENUM

[76] Inventor: Charles W. Spengler, 3310 Deforest Ave., Cincinnati, Ohio 45209

[21] Appl. No.: 607,793

[22] Filed: May 7, 1984

[51] Int. Cl.³ .............................................. A01K 1/03
[52] U.S. Cl. .................................... 119/15; 119/17
[58] Field of Search ................... 119/15, 17, 18, 19

[56] References Cited

U.S. PATENT DOCUMENTS

| | | | |
|---|---|---|---|
| 3,220,383 | 11/1965 | Bruner | 119/17 |
| 3,557,756 | 1/1971 | Ramsey | 119/15 |
| 3,630,174 | 12/1971 | Runkle et al. | 119/15 |
| 3,662,713 | 5/1972 | Sachs | 119/18 |
| 3,749,061 | 7/1973 | Connelly | 119/19 |
| 3,765,374 | 10/1973 | Kolste | 119/18 |
| 3,919,978 | 11/1975 | Schaefer | 119/19 |
| 3,924,571 | 12/1975 | Holman | 119/15 |
| 4,036,177 | 7/1977 | DeSmit | 119/18 |
| 4,085,705 | 4/1978 | Gland et al. | 119/17 |
| 4,201,153 | 5/1980 | Nace | 119/3 |
| 4,249,482 | 2/1981 | Harr | 119/17 |
| 4,343,261 | 8/1982 | Thomas | 119/15 |
| 4,348,985 | 9/1982 | Leong | 119/15 |
| 4,365,590 | 12/1982 | Ruggieri et al. | 119/15 |
| 4,402,280 | 9/1983 | Thomas | 119/15 |

*Primary Examiner*—Hugh R. Chamblee
*Attorney, Agent, or Firm*—Wood, Herron & Evans

[57] ABSTRACT

An improved environmental chamber assembly, such as for caging animals, has a plurality of chambers or cages which are entirely supported by a free-standing plenum, which plenum supplies and/or exhausts air or a controlled atmosphere to and/or from the chambers or cages. The assembly is of a modular structure, with each chamber being separately attachable to the plenum. One embodiment utilizes a free-standing double plenum for carrying air both to and from the chambers, thereby permitting the use of chambers sealable from the ambient atmosphere. The chambers sit on individual shelves supported from connecting tubes which connect air inlets and air outlets of the sealable chambers with the double plenum. A further modification of the assembly provides for the use of a second double plenum arranged with the first double plenum in back-to-back relation, with the two double plenums being separable and capable of individual mounting, as on a wall.

14 Claims, 7 Drawing Figures

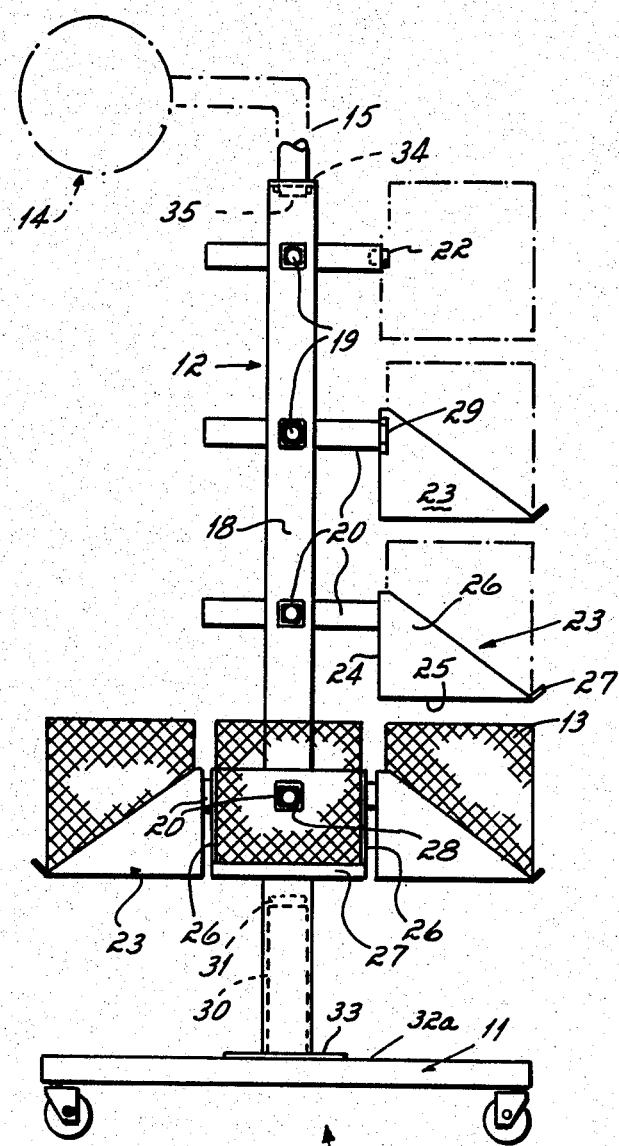
FIG. 1
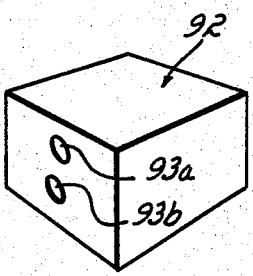
FIG. 4a
FIG. 4b
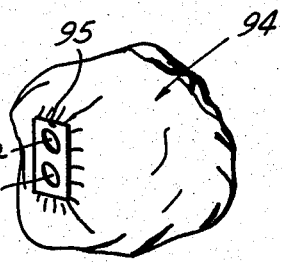
FIG. 4c
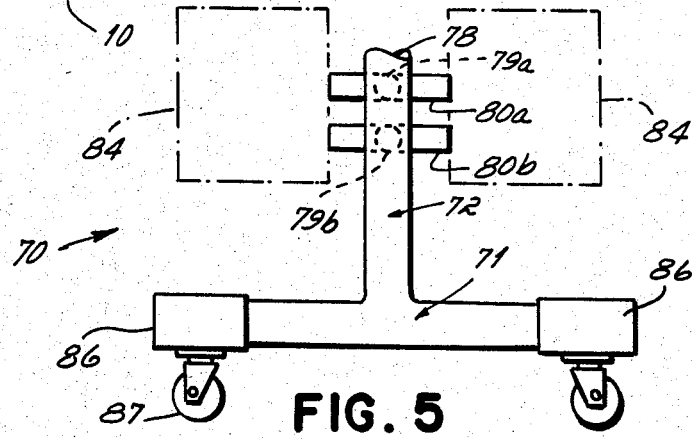
FIG. 5

FREE-STANDING ENVIRONMENTAL CHAMBERS SUPPORTED BY PLENUM

FIELD OF THE INVENTION

This invention is generally related to environmental chambers, and is more particularly related to modular housing structures for holding animals, such as laboratory animals, in individual and environmentally isolated chambers or cages.

BACKGROUND OF THE INVENTION

All animal caging systems and installations for keeping and tending animals, such as laboratory test animals, must address ventilation requirements for the cages, cleaning and maintenance of the cages, and feeding and manipulation of the animals in the cages. Often of primary concern in such caging systems is the prevention of cross-infection or cross-contamination between animals in adjacent cages. Yet another and often significant consideration in caging systems in the adaptability of the system to the particular area in which it is located, such as a laboratory, where available space may be at a premium.

Caging systems in the past have attempted to meet many of these noted considerations. For instance, U.S. Pat. No. 3,220,383 discloses a caging system for laboratory test animals which provides for the individual mounting of animal cages in a plenum fixed to an upright surface, i.e, a wall. Each of the individual cages has sockets in its rear wall in which are received pipes extending from the plenum, permitting the attachment and removal of the cages from the plenum. A suction ventilation of the cages is provided that draws air through the cages and out through the plenum to keep the area surrounding the cages fairly free from odors generated by the caged animals.

Although the U.S. Pat. No. 3,320,383 caging installation has desirable features, it suffers from being a wall-mounted installation. In many laboratories, wall space can be a critical commodity and not worth sacrificing to support a caging system such as this. Further, since the U.S. Pat. No. 3,320,383 system is fixed to a wall, it cannot be moved around a laboratory, except through laborious disassembly and reassembly of the system on another wall. It is much more desirable to have a free-standing caging structure which can be moved around from place to place as the need arises.

U.S. Pat. No. 3,924,571 discloses another modular system for caging animals, each cage being separately supplied with a controlled environment. The U.S. Pat. No. 3,924,571 caging system is free-standing, and capable of being easily moved around from place to place, being mounted on wheels. This caging system, however, suffers from the use of a fairly substantial fixed framework housing supporting the various cages. This framework is far more elaborate than that of the U.S. Pat. No. 3,220,383 system, where the simple plenum actually carries the cages.

In brief, there is a need for an environmental chamber apparatus which overcomes the problems or disadvantages associated with current structures. There is also a need for such structures which provide economies in assembly and use.

SUMMARY OF THE INVENTION

This invention is directed to an improved environmental chamber assembly, such as for caging animals, having a plurality of environmental chambers which are separately attachable to a free-standing plenum carrying a gas or aerosol, such as air, to or from each chamber, with the plenum forming the sole support for the chambers.

The inventive apparatus has significant utilities in other areas. For example, the apparatus can provide controllable environments for plants, microorganisms or cells. Food or chemical processing can also be conducted in the environmental chambers. These and other forms of the invention will be understood with reference to the following description.

In one form of the invention, the plenum has a base portion, which advantageously is provided with wheels or the like, and a single upright conduit from which extend a plurality of chamber connecting tubes. The chambers are carried by the connecting tubes, such as on individual trays or shelves carried by the connecting tubes. A device is advantageously provided to pass negative or positive gas flow through the chambers via the plenum.

Another embodiment of the invention has at least a pair of spaced, rigid conduit uprights extending from a base portion. At least one elongated rigid transverse conduit extends between the uprights, and is in fluid communication with the interior of an upright which is connected to a ventilator, such as a vacuum device or a fan. Each of the chambers has a back wall with a socket therein which receives one of a plurality of connecting tubes extending from the transverse conduit. The chamber can be directly suspended from the connecting tube, or carried on a tray or shelf which is itself carried by the connecting tube.

In another form of the invention, an improved modular animal caging apparatus has individual environmentally isolated chambers or cages for each animal. The plurality of cages are substantially sealable from the ambient atmosphere. Each cage has a socket for admitting air, or a controlled atmosphere, to the cage, and another socket for exhausting air from the cage. The free-standing, closed, double-plenum carrying air to and from each cage has a base portion from which extend a pair of spaced conduit uprights. A plurality of transverse conduits extend between the conduit uprights, with one transverse conduit of each pair in fluid communication with the interior of one of the conduit uprights for carrying air to the cage inlet, and the other transverse conduit of the pair in fluid communication with the interior of the other of said conduit uprights for carrying air out of the cages.

Pairs of connecting tubes which extend from the transverse conduits of the plenum are received in the inlet and outlet sockets of the cages. A small shelf upon which the cage sits is carried by the connecting tubes.

A modification of the foregoing embodiment further provides for the use of a second double-plenum for carrying air to and from another set of cages. Both the first and second double plenums, when arranged in back-to-back relation, are free-standing. The two double plenums are releasably attached, such that they can be separated and individually mounted on an upright surface, such as a wall, if desired.

BRIEF DESCRIPTION OF THE DRAWINGS

FIG. 1 is a front elevational view of a first embodiment of an environmental chamber assembly made in accordance with the principles of this invention;

FIGS. 4a–4c diagrammatically show three types of environmental chamber structures which can advantageously be used with this invention; and FIG. 5 is a partial side elevational view of the base portion of yet another embodiment of this invention.

DETAILED DESCRIPTION OF THE INVENTION

Figure 3:
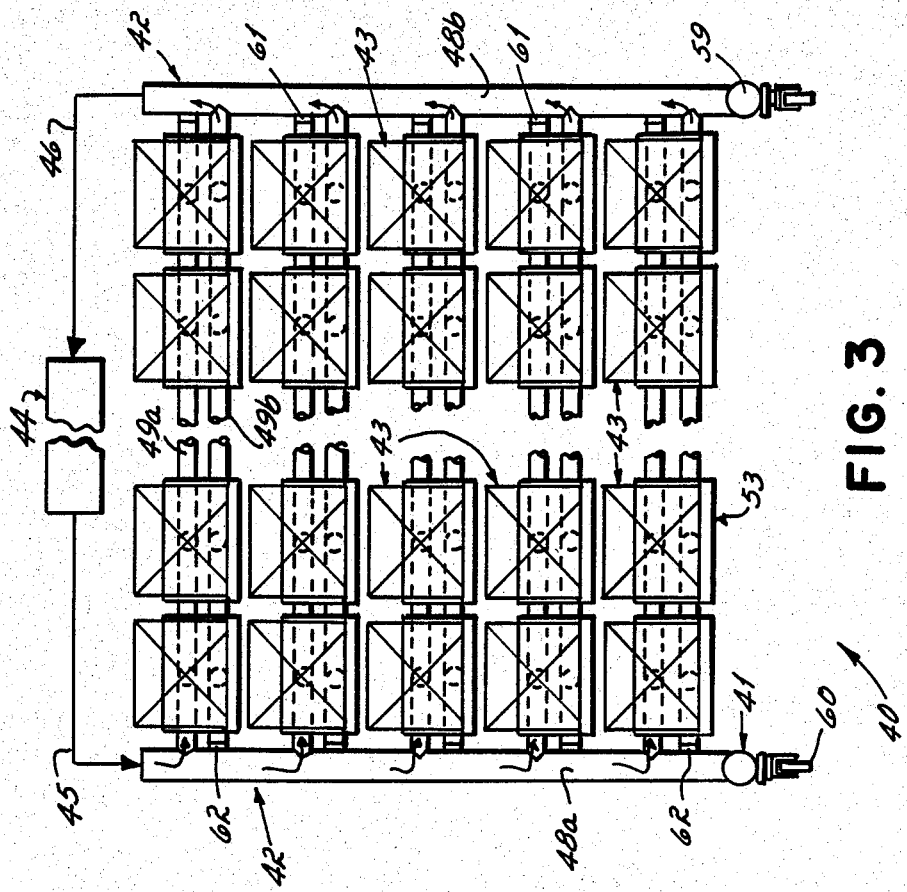
FIG. 3 is a front elevational view of the embodiment of FIG. 2.

With specific reference now to FIG. 1, a first embodiment of this invention in a free-standing environmental chamber assembly having a plurality of chambers supported by a plenum is shown particularly adapted for caging animals, and is generally indicated at 10. Although the invention shown in this embodiment, as well as the other embodiments which will be discussed herein, is adapted particularly for the caging of animals, such as monkeys, rabbits, mice, rats and the like, it should be recognized that its usefulness is not necessarily so limited. For example, although the invention may find application in the laboratory environment, it could also be readily adapted to chicken farming, wherein it is often desirable to separate the fowl to prevent communication of contagious avian diseases which could threaten an entire flock.

The animal caging apparatus 10 is generally comprised of a base portion 11, a single air plenum 12 and a plurality of environmental chambers in the form of cages 13 which are carried by the plenum 12. An air moving device, or ventilator 14, for moving air through the plenum 12, is shown schematically. Any well known device of this type for providing the controlled atmosphere to the chamber may be used. The ventilator 14 may be a fan for providing a positive air flow through the plenum and into the cages 13, or a negative air flow, as here, withdrawing air from the cages 13 through the plenum 12. A vacuum device or other air pump could serve the same ends. The ventilator 14 may be carried on the caging apparatus 10 for movement therewith, or may be located elsewhere, communicating with the air plenum by a length of flexible hose, here shown schematically at 15.

The air plenum 12 has a single vertically upright air conduit 18. A plurality of radial openings 19 are formed in vertically spaced groups along the length of the vertical conduit 18, with each group of openings equianguluarly spaced around the circumference of the vertical conduit 18, with 3–4 openings per group. Received in these openings 19 are connecting and mounting tubes 20 which here extend radially from the openings.

The vertical conduit 18 and connecting tubes 20 are formed of stainless steel or PVC plastic pipe and pipe fittings. The connecting tubes 20 can be purchased with screw threaded ends which will simply screw into appropriately sized openings 19 provided with corresponding tapped threads, or the parts may be press-fitted or sealed with adhesives or sealing compounds. Alternatively, male adapters 22 can be used with standard PVC pipe to form threaded end connectors for the connecting tubes 20.

Attached to each of the connecting tubes 20 is a cage supporting tray 23. Each of the trays 23 is formed of plastic or sheet metal, and has a back wall 24, a bottom 25, and two side walls 26 which slope downwardly from the top of the back wall 24 to the front of the bottom 25. An upturned lip 27 may advantageously be provided across the front of the bottom 25, as by bending up a portion of the bottom 25, to further locate a cage 13 placed into the tray 23.

Each of the trays 23 has an opening 28 formed in the back wall in which is received the threaded portion of a male adapter 22. The trays 23 are fixed in position on a connecting tube through the use of a large nut 29 which is received on the male adapter 22. The trays can be directly attached or removed from the connecting tubes 20 as desired or required. It will, of course, be recognized that the trays 23 may be secured to the connecting tubes 20 in other ways, as by permanent fixation thereto or being formed integral with the connecting tubes 20. For purposes of adaptability, convenience in assembly and economy, the present arrangement is considered most desirable. The cages 13 can additionally be provided with a connecting tube socket (not shown) into which a portion of the male adapter 22 extends. A screen may have to be provided over either the male adapter opening or the pipe socket, in this event, to prevent animals or debris from entering the connecting tube 20.

The vertical conduit 18 of the single air plenum 12 is mounted on base 11 through the use of a shaft stem 30 which is permanently fixed to the upward side of base 11. The stem 30 is received in one open end on the conduit 18. The conduit 18 is not fixed to the stem 30, but is rather allowed to rotate about the stem to thereby permit the plenum 12 to be rotated for access from a single position to all of the cages 13 carried thereon. A plug 31, such as one made of styrene plastic, forms an air gasket within the conduit 18 in the area of the stem 30.

The base 11 is formed of a single platform 32a, which is provided with wheels or casters 32 to add further mobility to the air plenum 12. A mounting plate 33 is fixed to the stem 30 fixes the stem 30 to the upward surface of the platform 32a, as by the use of screws (not shown) extending through holes provided in the plate (also not shown).

The top of the vertical conduit 18 has a plate 34 located within its end which has an opening 35 formed therein through which the air hose 15 communicates with the interior of the single air plenum 12.

This embodiment thus provides an environmental chamber assembly in the form of an animal caging apparatus which has a free-standing plenum for carrying air, or some other gas, to or from a plurality of cages, with the plenum forming the sole support for the cages. In use, the number of cages desired are placed on a corresponding number of trays, and the apparatus 10 placed in a desired location. A hose 15 from a ventilator 14 is inserted through the aperture in the plate 34, and the ventilator 14 is then actuated to draw air from the plenum 12. Since the cages 13 are provided either open or with some openings therein, air from the room will move through the cages, then through the tubes 20, and out through the vertical conduit 18 thereby reducing or preventing annoying odors and the like from emanating into the room. The draft through the cages further serves to prevent cross-contamination of atmosphere from one cage to another. Those tubes 20 which are not supporting a cage 23 may simply be left open, or can alternatively be temporarily plugged until needed.

Figure 2:
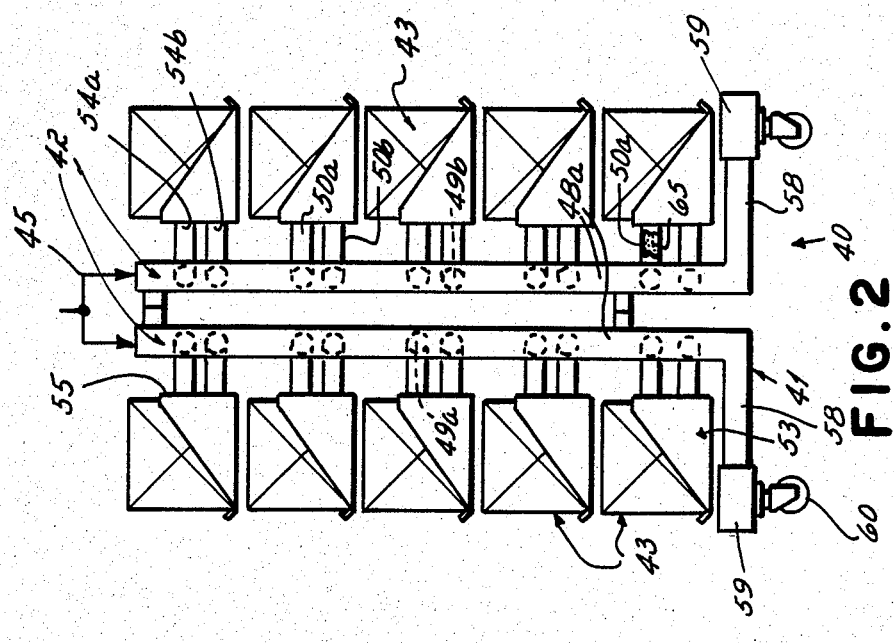
FIG. 2 is a side elevational view of another embodiment of the invention.

Reference is now made to FIGS. 2 and 3 in which another embodiment of the invention is illustrated. This second embodiment is again in the form of an animal caging apparatus 40 having a base portion 41, a pair of double air plenums 42 which are arranged in back-to-back relationship and releasably secured together, and a plurality of environmental chambers or cages 43 carried by the two double plenums. A ventilator 44 provides a pressurized flow of air or other atmosphere to the two double plenums via a hose 45. The ventilator 44 can additionally withdraw air from the double plenums through hose 46 to enhance circulation through the apparatus.

More specifically, each of the double plenums 42 has a pair of vertical upright conduit portions 48a and 48b, which are alternately connected to horizontal or transverse conduits 49a and 49b. Pairs of connecting tubes 50a and 50b extend from the transverse conduits 49a and 49b, with the pairs of connecting tubes spaced along the length of the transverse conduits. A plurality of cage supporting trays 53 are carried by the pairs of connecting tubes. In this embodiment, two tube sockets 54a and 54b are provided in the back wall 55 of each of the trays, which sockets receive the connecting tubes 50a and 50b. The trays 53 are attached to the connecting tubes 50a and 50b in the same manner as described in relation to the embodiment of FIG. 1.

The base portion 41 of the apparatus 40 constitutes back-to-back elbow portions 58 which extend downwardly and outwardly from the vertical uprights 48a and 48b. The elbow portions 58 are provided with end assemblies 59 having wheels 60 for added mobility for the apparatus 40. The end assemblies 59 close the ends of the elbows 58, sealing these ends of the vertical conduits 48a and 48b. As previously indicated, the two double plenums 42 are arranged in back-to-back relation and are releasably connected by top and bottom couplings 61.

The PVC pipe and pipe elements previously described are again most advantageously used as the structural elements for the plenum in this, as well as the other embodiments, described herein.

Each of the transverse conduits 49a pass through the side wall of upright conduit 48a, and are thus in fluid communication with the interior of the vertical conduit. The other end of each transverse conduit 49a is fixed to the upright conduit 48b, but is blocked at this end either by the exterior side wall of the upright conduit 48b or through the use of a plug 61.

Each transverse conduit 49b extends through, and is fixed to, the side wall of conduit 48b, and is therefore in fluid communication with the interior of the vertical conduit 48b. The other end of transverse conduit 49b is fixed to the conduit upright 48a, with this end blocked off by a plug 62. The various conduits may be fixed as indicated above by snap-fitting, threaded coupling, gluing or welding.

Each of the cages 43 are preferably chambers which can be sealed from the ambient atmosphere. The cages are carried by the trays 53, and are each provided with an air inlet socket 63a and an air outlet socket 63b in which are respectively received the air inlet tube 50a and the air outlet tube 50b. Air supplied under pressure to upright conduit 48a flows into transverse conduits 49a and into each of the cages 53 via connecting tubes 50a. Air exits or is withdrawn from the chambers 43 out through connecting tube 50b, then into transverse tube 49b and out through vertical conduit 48b. This air flow is indicated by the arrows in FIGS. 2 and 3. A filter or filter medium 65 is advantageously provided in the connecting tubes 50a to filter air admitted to the cages 43.

The cages 43 may be easily attached and removed from the connecting tubes 50a and 50b due to the simple sliding engagement of the cage with the tubes. Other chambers may be employed or developed hereinafter. A screen may be provided over the ends of the connecting tubes 50a and 50b to prevent animals and/or debris from getting inside the tubes. As previously indicated, the two double plenums 42 are detachable at coupling 61, which can be any type of standard releasable coupling device, in the event that it is desired to place the plenums 42 separately against a wall or other upright surface, for example. The apparatus 40 of course is no longer free-standing in such a mode of use.

It will thus be seen that the modular caging apparatus 40 of this second embodiment thus provides great flexibility in the number of cages which can be employed, is completely free-standing and very mobile for ease of placement and use in limited space, and is comprised of a minimum number of elements, thus reducing its cost and providing ease in assembly. It is further adapted to be wall mounted, if desired.

FIG. 5 shows a portion of a modified version of the second embodiment of FIGS. 2 and 3. This modified embodiment 70 has only one double plenum 72 with a pair of spaced apart upright conduits 78 extending from base 71, which uprights are joined by pairs of transverse conduits 79a and 79b, as in the second embodiment previously described. (Only one end of this embodiment is shown here, the other end being identical in structure). Pairs of connecting tubes 80a and 80b extend from opposite sides of the transverse conduits 79a, 79b, and directly carry the cages 84 which have sockets to receive the tubes 80a, 80b; no trays are used in this modified version to support the cages 84. The connecting tubes 80a and 80b are fixed to the transverse conduits in the same manner as previously described.

Base 71 supporting the vertical uprights 78 is an inverted T having end assemblies 86 received on the outwardly extending ends of the T and which seal this end of the conduit uprights 78. Wheels 87 are provided for ease in moving the apparatus 70 around. In all other respects, the modified version of the apparatus shown in FIG. 5 is the same as that shown in FIGS. 2 and 3, and further description herein would be redundant.

Three different configurations for sealable chambers or cages particularly useful with the embodiment of FIG. 5 are shown in FIGS. 4a through 4c. Since no supporting tray is used with the modified embodiment of FIG. 5 and the cages are directly connected to the connecting tubes 80a and 80b, any of the cage configurations shown in FIGS. 4a through 4c can be easily used therewith.

FIG. 4a shows a spherical shape for the chamber, such as may be made out of clear acrylic plastic 90, and has two sockets 91a and 91b in which the connecting tubes 80a and 80b are received and from which the cage 90 is suspended by the air plenum 78. FIG. 4b shows a cube shaped chamber 92 having sockets 93a and 93b in which the connecting tubes are received. FIG. 4c shows a chamber made from a flexible membrane, such as a transparent plastic film 94, having a mounting plate 95 in which are formed sockets 96a and 96b in which the connecting tube ends are received. It will of course be recognized that although the particular cage configurations in FIGS. 4a through 4c have been set forth as particularly useful with the apparatus shown in FIG. 5, all the cages can be modified for use with any of the embodiments of this invention.

From the foregoing, it will thus be appreciated that this invention provides a free-standing environmental chamber assembly supported by a plenum. The apparatus is very economical, easily assembled and adaptable into a modular system. Protection from inter-communication of atmosphere between separate environmental chambers is provided, which is particularly advantageous in the isolation of a plurality of animals such as may be used in laboratory studies.

Thus, while the invention has been described in connection with certain presently preferred embodiments, those skilled in the art will recognize modifications of structure, arrangement, portion, elements, materials, and components which can be used in the practice of the invention without departing from the principles of this invention.

What is claimed is:

1. An improved environmental chamber assembly comprising:
   a plurality of chambers substantially sealable from the ambient atmosphere, each chamber having a back wall with an air inlet and an air outlet formed therein, and
   a free-standing double plenum for carrying air to and from said chambers and providing the sole support for said chambers, said plenum having a base, a pair of spaced vertical conduits extending from said base, said vertical conduits adapted to be connected to a means for moving air through said vertical conduits, pairs of elongated horizontal conduits extending between said vertical conduits, and mounting means on said horizontal conduits for connecting said chambers to said horizontal conduits, said mounting means including a plurality of pairs of connecting tubes extending from said horizontal conduits, each pair of connecting tubes connecting said air inlet and air outlet of a respective chamber with a respective pair of horizontal conduits, one of each of said pairs of horizontal conduits adapted to carry air from one vertical conduit to each said chamber air inlet via one connecting tube of a respective pair of connecting tubes, the other of said pair of horizontal conduits carrying air from said chambers via the other connecting tube of a respective pair of connecting tubes to the other of said vertical conduits, each of said horizontal conduits being closed at an end.

2. The environmental chamber assembly of claim 1 wherein said double plenum has a front side and a back side and chamber mounting means on both said front side and said back side.

3. The environmental chamber assembly of claim 1 wherein each said chamber when sealed forms a closed cube.

4. The environmental chamber assembly of claim 1 wherein each said chamber when sealed forms a closed sphere.

5. The environmental chamber assembly of claim 1 wherein each said chamber when sealed is a closed flexible membrane.

6. The environmental chamber assembly of claim 1 wherein said chamber mounting means further includes a shelf carried by said connecting tubes upon which each chamber sits.

7. The environmental chamber assembly of claim 6 wherein each shelf has a rear wall through which said connecting tubes extend a small distance, such that each said chamber inlet and outlet can be engaged with a respective pair of connecting tubes by a rearward sliding movement of said chamber on said shelf with said inlet and outlet aligned with said connecting tubes.

8. The environmental chamber assembly of claim 6 including a second double-plenum for carrying air to and from chambers different from said chambers supplied with air by said first double plenum, means for releasably connecting said double plenums in back-to-back relation, said first and second double plenums being free-standing when so connected in back-to-back relation, said double plenums being individually mountable on an upright surface when said two double plenums are separated.

9. The environmental chamber assembly of claim 6 further including a removable air filter in each of said air inlet connecting tubes.

10. An improved modular animal caging system providing an individual environmentally isolated chamber for each animal, comprising:
    a plurality of cages substantially sealable from the ambient atmosphere, each cage having a first opening for admitting a controlled atmosphere to said cage, and a second opening for exhausting said controlled atmosphere,
    a free-standing closed double-plenum for carrying said controlled atmosphere to and from each cage, said double-plenum having a base portion from which extend a single pair of spaced vertical conduits, said vertical conduits adapted to be connected to a means for moving said controlled atmosphere through said vertical conduits, at least a pair of horizontal conduits extending between said vertical conduits, one horizontal conduit of said pair being in fluid communication with the interior of one of said vertical conduits for carrying said controlled atmosphere to said cages, the other horizontal conduit of said pair being in fluid communication with the interior of the other of said vertical conduits for carrying said controlled atmosphere from said cages, a plurality of pairs of mounting tubes for mounting said cages to said horizontal conduits and for inletting and outletting said controlled atmosphere to and from said cages, each said mounting tube being in fluid communication with a respective interior of a horizontal conduit, one of each of said pairs of mounting tubes connecting said first cage opening with said horizontal conduit carrying said controlled atmosphere to said cage, the other of said pair of mounting tubes connecting said second cage opening with said other horizontal conduit carrying said controlled atmosphere from said cage, said double-plenum forming the sole support for said cages, and
    means for supplying and exhausting said controlled atmosphere to and from said cages via said double-plenum.

11. An improved environmental chamber assembly comprising:
    a plurality of environmental chambers,
    a base,
    a rigid conduit extending generally vertically from said base, said vertical conduit adapted to be connected to a means for moving a gas through said vertical conduit,
    a plurality of connecting tubes radiating from said vertical conduit and communicating with said vertical conduit interior for connecting said environmental chambers to said vertical conduit for movement of gas through said environmental chambers, and a plurality of shelves, each shelf carried by a respective connecting tube for supporting an environmental chamber thereon, said base, rigid conduit, connecting tubes and shelves forming a free-standing plenum providing the support for said plurality of environmental chambers.

12. An improved environmental chamber assembly comprising:

a plurality of environmental chambers, a base, a pair of spaced rigid conduits extending generally vertically from said base, said vertical conduits adapted to be connected to a means for moving a gas through said vertical conduits, a plurality of elongated rigid conduits extending generally horizontally between said vertical conduit and communicating with the interior of said vertical conduits for movement of gas through each said horizontal conduit, a plurality of connecting tubes extending from each of said horizontal conduits, each connecting tube communicating with a respective horizontal conduit interior for movement of gas through each said connecting tube, and a plurality of shelves, each shelf carried by a respective connecting tube for supporting an environmental chamber thereon, said base, vertical and horizontal conduits, connecting tubes and shelves forming a free-standing plenum providing the support for said plurality of environmental chambers.

13. The improved environmental chamber assembly of claim 12 wherein said horizontal conduits are in pairs, one of each of said horizontal conduit pairs adapted to carry gas from one vertical conduit to said chambers, the other of said pair of horizontal conduits carrying the gas from said chambers to the other of said vertical conduits, and said connecting tubes are also arranged in pairs along said horizontal conduit pairs, one of each pair of connecting tubes forming a gas inlet for a respective environmental chamber and the other of said pair of connecting tubes forming an outlet for said respective environmental chamber.

14. The improved environmental chamber assembly of claim 13 wherein said horizontal conduits have a front side and a back side with pairs of connecting tubes extending from both said front and back sides to enable mounting of cages on both said front and back sides.

* * * * *